(12) United States Patent
Washio et al.

(10) Patent No.: US 10,833,468 B2
(45) Date of Patent: Nov. 10, 2020

(54) METHOD FOR MANUFACTURING ELECTRICAL CONNECTION ASSEMBLY

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka-shi (JP)

(72) Inventors: Kazuhiro Washio, Mie (JP); Yasuo Omori, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 137 days.

(21) Appl. No.: 16/315,790

(22) PCT Filed: Jun. 22, 2017

(86) PCT No.: PCT/JP2017/022973
§ 371 (c)(1),
(2) Date: Jan. 7, 2019

(87) PCT Pub. No.: WO2018/012235
PCT Pub. Date: Jan. 18, 2018

(65) Prior Publication Data
US 2019/0229482 A1    Jul. 25, 2019

(30) Foreign Application Priority Data
Jul. 12, 2016    (JP) .................. 2016-137251

(51) Int. Cl.
*B23K 1/00*    (2006.01)
*H01R 43/02*    (2006.01)
(Continued)

(52) U.S. Cl.
CPC ....... *H01R 43/0228* (2013.01); *B23K 1/0008* (2013.01); *B23K 1/0016* (2013.01);
(Continued)

(58) Field of Classification Search
CPC .... H01R 43/0228; H01R 4/024; H01R 4/028; H01R 43/0249; H01R 13/405;
(Continued)

(56) References Cited

U.S. PATENT DOCUMENTS 4,948,381 A * 8/1990 Saito .................. H01R 4/2433
                                                 439/405
5,681,181 A * 10/1997 Atsumi ............... H01R 4/2429
                                                 439/404
(Continued)

FOREIGN PATENT DOCUMENTS

JP         11-0837        1/1999
JP         2010-146939    7/2010
(Continued)

OTHER PUBLICATIONS

International Search Report dated Sep. 12, 2017.

*Primary Examiner* — Kiley S Stoner
(74) *Attorney, Agent, or Firm* — Gerald E. Hespos; Michael J. Porco; Matthew T. Hespos

(57) ABSTRACT

A method to manufacture an electrical connection assembly includes: preparing a wiring material (10) that has conductors and an insulation coating, and preparing a connector (CN) including terminals (20) each having an outward projecting portion (24) with a conductor connection surface (27a) and an insulating housing (30). The method proceeds by setting solder on the conductor connection surfaces (27a) and then removing the insulation coating covering parts to be connected from surfaces of the conductors by melting or dissolving the insulation coating. The method also electri-
(Continued)

cally connects the conductors of the parts to be connected to the conductor connection surfaces (27a) by the solder by heating the parts of the respective conductors to be connected together with the solder while holding a state where the conductors of the wiring material (10) are arrayed at intervals from each other in an array direction.

8 Claims, 16 Drawing Sheets

(51) Int. Cl.
*H01R 4/02* (2006.01)
*B23K 101/32* (2006.01)
*B23K 101/36* (2006.01)
*H01R 13/405* (2006.01)

(52) U.S. Cl.
CPC ............ *H01R 4/024* (2013.01); *H01R 4/028* (2013.01); *H01R 43/0249* (2013.01); *B23K 2101/32* (2018.08); *B23K 2101/36* (2018.08); *H01R 13/405* (2013.01)

(58) Field of Classification Search
CPC ............... B23K 1/0016; B23K 1/0008; B23K 2101/36–42; B23K 2101/32; B23K 20/004; B23K 20/005; B23K 20/007; H01L 24/85–86
USPC ............. 228/180.5, 4.5, 904, 179.1–180.22, 228/245–262
See application file for complete search history.

(56) References Cited

U.S. PATENT DOCUMENTS

| | | | | |
|---|---|---|---|---|
| 5,766,033 A | * | 6/1998 | Davis | H01R 43/24 |
| | | | | 439/404 |
| 6,135,827 A | * | 10/2000 | Okabe | H01R 4/2429 |
| | | | | 439/398 |
| 6,167,616 B1 | | 1/2001 | Shinchi | |
| 2002/0042216 A1 | * | 4/2002 | Kato | H01R 4/66 |
| | | | | 439/92 |
| 2003/0129880 A1 | * | 7/2003 | Arnett | H01R 24/64 |
| | | | | 439/676 |
| 2006/0183359 A1 | * | 8/2006 | Gerber | H01R 4/2429 |
| | | | | 439/76.1 |
| 2009/0197450 A1 | * | 8/2009 | Ooki | H01R 13/5208 |
| | | | | 439/271 |
| 2010/0015845 A1 | * | 1/2010 | Kaufhold | H01R 4/2429 |
| | | | | 439/404 |
| 2011/0034084 A1 | | 2/2011 | Hsueh et al. | |
| 2014/0106628 A1 | * | 4/2014 | Sato | H01R 4/206 |
| | | | | 439/877 |
| 2019/0252804 A1 | * | 8/2019 | Washio | H01R 9/03 |
| 2020/0014123 A1 | * | 1/2020 | Takeuchi | H01R 4/023 |
| 2020/0014138 A1 | * | 1/2020 | Takeuchi | H01R 4/024 |

FOREIGN PATENT DOCUMENTS

| | | |
|---|---|---|
| JP | 2014-209437 | 11/2014 |
| JP | 2016-48603 | 4/2016 |

\* cited by examiner

METHOD FOR MANUFACTURING ELECTRICAL CONNECTION ASSEMBLY

BACKGROUND

Field of the Invention

The invention relates to an electrical connection assembly used in an automotive vehicle or the like and including a wiring material and a connector.

Related Art

A wiring material used in an automotive vehicle or the like includes a flat material in which conductors are arrayed in a direction perpendicular to an axial direction of the conductors. The conductors included in the wiring material are connected to terminals of a connector so that the conductors of the wiring material then can be connected to other conductors.

Japanese Unexamined Patent Publication No. 2010-146939 discloses a method for connecting the above-described wiring material to terminals by soldering an end of each wire to each terminal. In the method described in Japanese Unexamined Patent Publication No. 2010-146939, the insulation coating of the wiring material is removed in advance at the end of each of the wires to expose the conductor and the wires are held in parts near tips of the conductors so that the tips of the conductors are aligned in a row. On the other hand, the connector to be connected to each wire includes the terminals in the form of thin plates corresponding to the respective wires and the housing for holding the terminals. The housing has a flat terminal array surface and holds the terminals such that the plurality of terminals are exposed on the terminal array surface. Cream solder is set on surfaces of the terminals in advance, and the tips of the conductors and the surfaces of the terminals are soldered by pressing the cream solder against the surfaces of the terminals and heating the cream solder by a heater with the tips of the conductors of the plurality of wires positioned on the cream solder.

However, in the above method, the insulation coatings of the wires need to be removed in advance before soldering. Therefore, efficiency is poor. Further, a connection failure may occur if the position of the wire is shifted and the insulation coating thereof contacts the surface of the terminal. If areas where the insulation coatings are removed in advance, i.e. areas where the conductors are exposed, are made larger to avoid such a situation, there is a higher risk of short-circuiting between the conductors.

The invention provides a method for manufacturing an electrical connection assembly with a wiring material including conductors and a connector and enables reliable and efficient electrical connection between the conductors and the connector while avoiding a short circuit between the conductors.

SUMMARY

The invention relates to a method for manufacturing an electrical connection assembly with a wiring material that includes conductors, an insulation coating that covers the conductors. The electrical connection assembly also includes a connector with terminals respectively corresponding to the conductors and an insulating housing for collectively holding the terminals. The conductors are connected conductively to the respective terminals while being arranged in an array direction perpendicular to a longitudinal direction of the conductors. This method includes a wiring material preparing step of preparing a wiring material including the insulation coating made of synthetic resin that is meltable or dissolvable by being heated. The method also includes a connector preparing step of preparing a connector, in which each of the terminals includes an outward projecting portion projecting out of the insulating housing from a surface of the insulating housing. Each outward projecting portion has a conductor connection surface at a position separated from the surface of the insulating housing, and the insulating housing holds the terminals such that the conductor connection surfaces are arranged in the array direction at the same intervals as the intervals of the conductors in the array direction. The method further includes a connecting step of removing the insulation coating from surfaces of the conductors by melting or dissolving the insulation coating by heating the insulation coating covering parts to be connected set in the respective conductors and electrically connecting the conductors exposed by removing the insulation coating to the conductor connection surfaces by the heating while the conductors are held in a state arrayed at intervals from each other in the array direction.

DETAILED DESCRIPTION

FIGS. 1 to 10 show a manufacturing method according to a first embodiment of the invention and an electrical connection assembly manufactured by this method. The electrical connection assembly includes a wiring material constituted by wires 10, and a connector CN for connecting the wires 10 to another connector.

Figure 6:
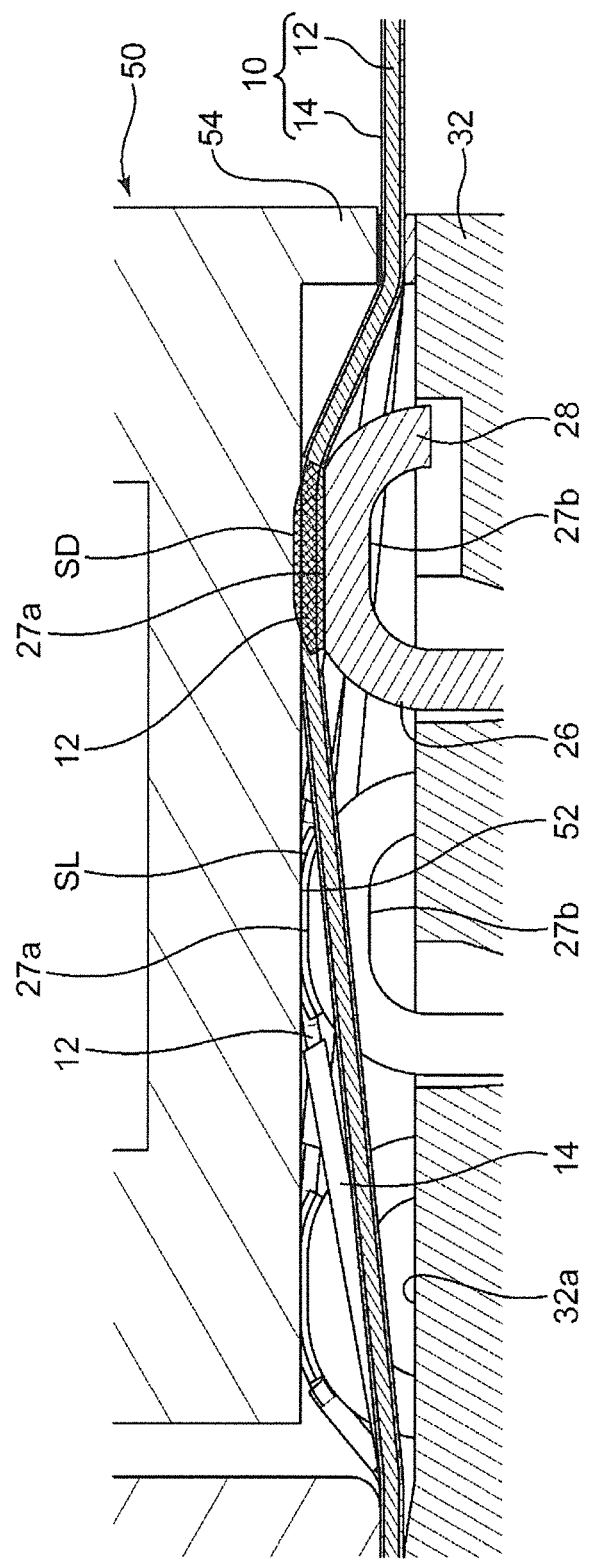
FIG. 6 is an enlarged view of an area enclosed by a frame line VI in FIG. 5.
Figure 7:
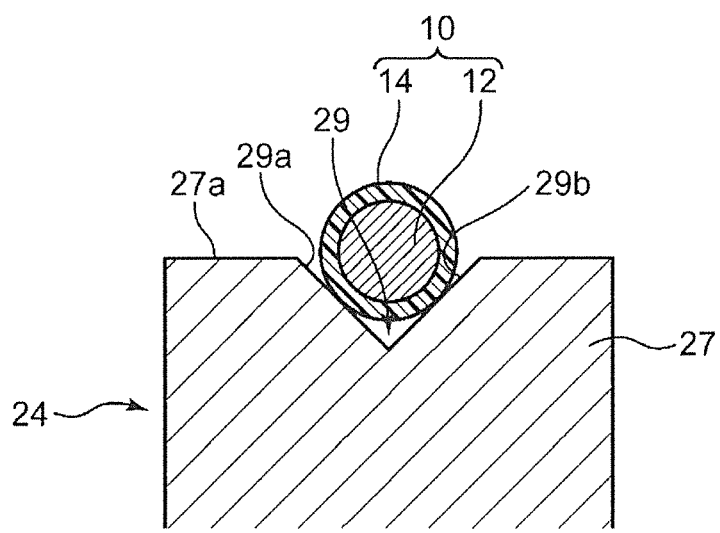
FIG. 7 is a front view in section showing a state where the wire is set in a recessed groove of the terminal.
Figure 8:
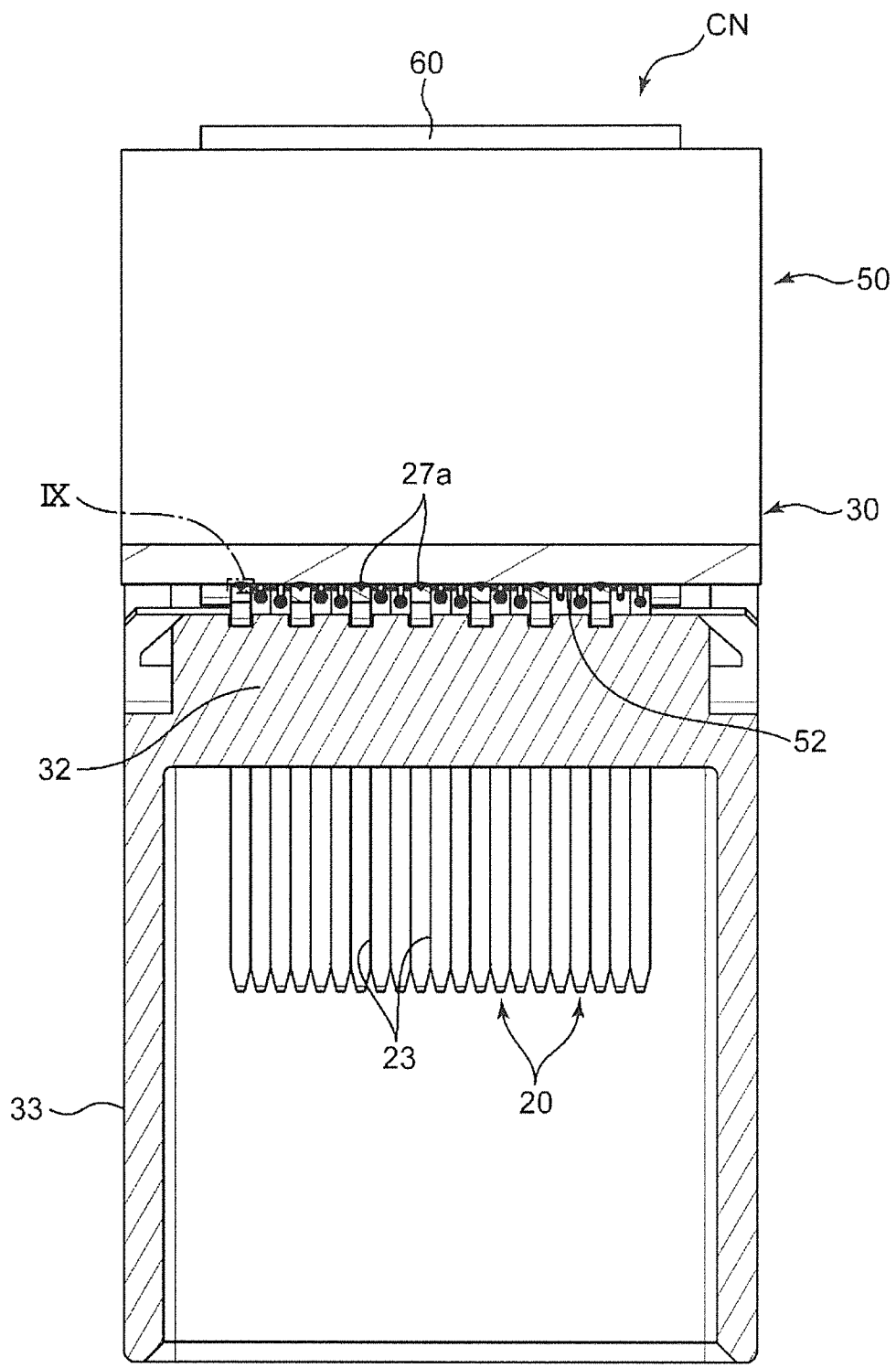
FIG. 8 is a front view in section showing the step shown in FIG. 4.
Figure 9:
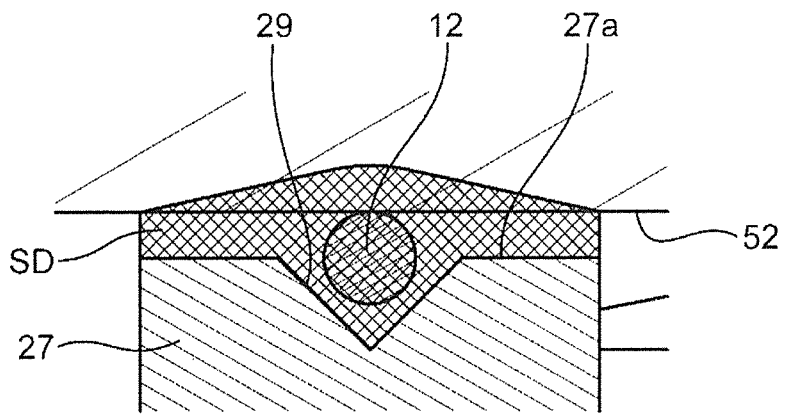
FIG. 9 is an enlarged view of an area enclosed by a frame line IX in FIG. 8.

Each of the wires 10 of the wiring material includes a conductor 12 and an insulation coating 14 for covering the conductor 12, as shown in FIGS. 6 and 7. The wires 10 are connected to the connector CN while being arranged at intervals in parallel to each other in an array direction perpendicular to a longitudinal direction thereof.

The connector CN includes terminals 20 respectively corresponding to the wires 10 and an insulating housing 30 for collectively holding the terminals 20.

Figure 5:
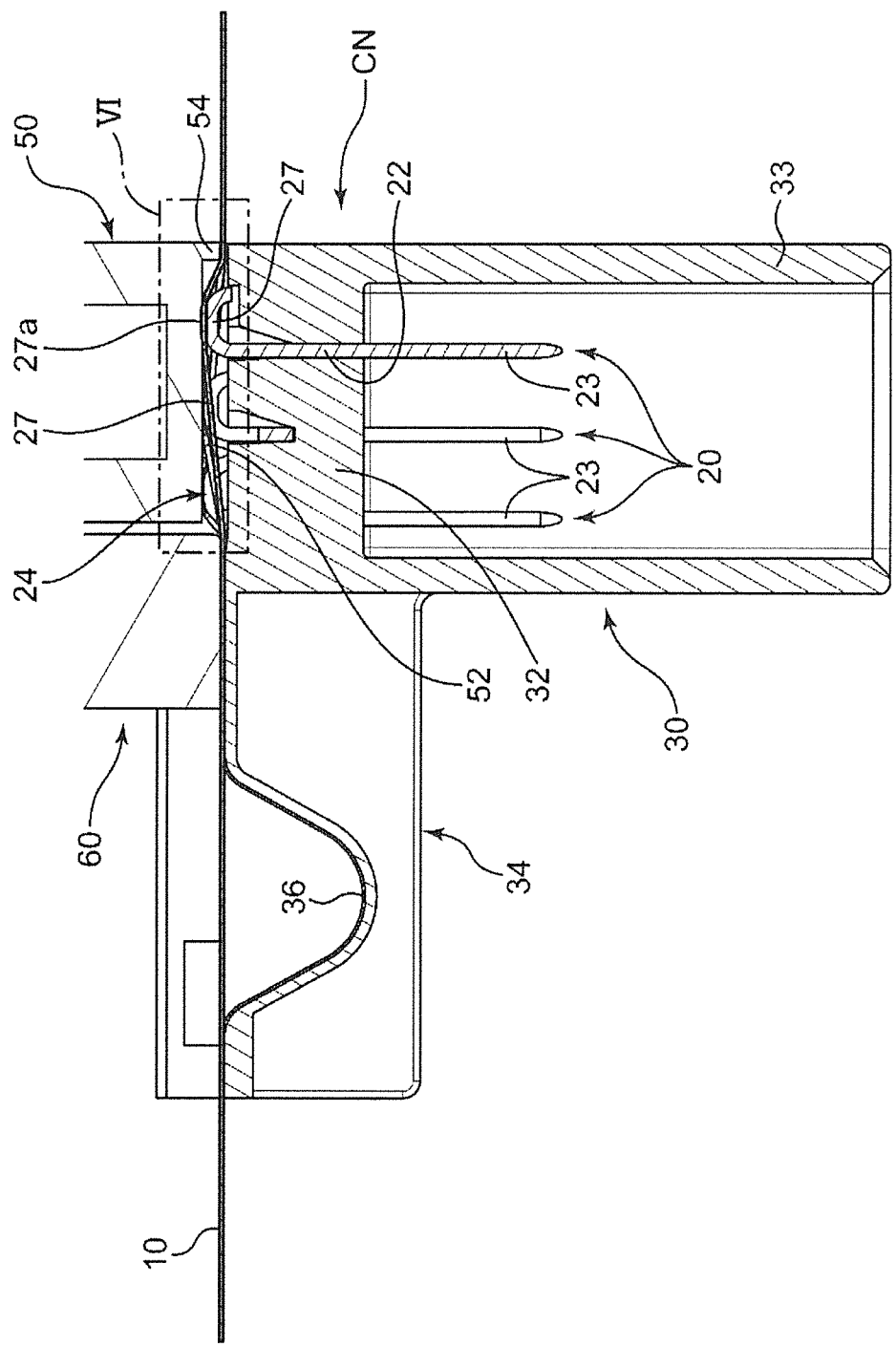
FIG. 5 is a side view in section showing the step shown in FIG. 4.

Each of the terminals 20 according to this embodiment is a male terminal formed of a single long metal plate and includes a held portion 22, an electrical contact portion 23 and an outward projecting portion 24, as shown in FIG. 5. The held portion 22 is to be held in the insulating housing 30 as described later. The electrical contact portion 23 is a male contact portion in this embodiment and is shaped to fit into a female contact portion of a mating terminal. Specifically, the electrical contact portion 23 is shaped to extend straight in a first direction from the held portion 22. The outward projecting portion 24 projects from the held portion 22 toward a side opposite to the electrical contact portion 23 and to be connected to the corresponding wire 10. The outward projecting portion 24 is described in detail later.

The insulating housing 30 is molded of an insulating material, such as synthetic resin, and integrally includes a terminal holding portion 32, a receptacle 33 and a wire holding portion 34.

The terminal holding portion 32 is a part for holding the held portion 22 of each of the terminals 20, and in the form of a block in this embodiment. The terminal holding portion 32 collectively holds the terminals 20 arrayed in the array direction to enable the wires 10 arranged at intervals in the array direction to be connected conductively to the respective outward projecting portions 24 of the terminals 20.

Specifically, the terminal holding portion 32 holds the held portions 22 of the terminals 20 with the respective terminals 20 penetrating through the terminal holding portions 32 in a direction parallel to the first direction. The first direction is perpendicular to both a longitudinal direction of the wires 10 and the array direction with the wires 10 connected to the terminals 20, and an upward direction in an orientation shown in FIG. 5. That is, parts of the terminals 20 including the held portions 22 penetrate through the terminal holding portion 32 in a vertical direction in the orientation shown in FIG. 5. The held portions 22 may be fixed to the terminal holding portion 32 by being press-fit into through holes in the terminal holding portion 32 or by adhesive or the like.

The electrical contact portion 23 of each terminal 20 extends in a direction (downward direction in the orientation shown in FIG. 5) opposite to the first direction from the held portion 22 with the held portion 22 held in the terminal holding portion 32 as described above, and is fit into the female contact portion of the mating terminal in this direction. The receptacle 33 is connected integrally to the terminal holding portion 32 and has a tubular shape to surround the electrical contact portions 23 on an outer side in a direction perpendicular to an axial direction (vertical direction in the orientation shown in FIG. 5) of the electrical contact portions 23.

The outward projecting portion 24 of each terminal 20 integrally includes a first projecting portion 26, a second projecting portion 27 and a third projecting portion 28, as shown in FIG. 6. The first projecting portion 26 projects in the first direction (up in FIG. 6) from an upper surface 32a in FIG. 6 of the terminal holding portion 32. The second projecting portion 27 extends from the first projecting portion 26 in a second direction (direction parallel to the upper surface 32a in this embodiment; lateral direction in FIG. 6) closer to a direction parallel to the surface of the terminal holding portion 32 than the first direction and perpendicular to the array direction. The third projecting portion 28 extends down in FIG. 6 and hence opposite to the first direction from aright end part in FIG. 6 on a side opposite to the first projecting portion 26.

In the first embodiment, the first projecting portion 26 has a bent shape to gradually approach from the first direction to the second direction. Similarly, the third projecting portion 28 has a bent shape to approach the downward direction in FIG. 6 and hence opposite to the first direction as extending away from the second projecting portion 27.

An outer side surface of the second projecting portion 27 (upper surface in FIG. 6) on a side opposite to the upper surface 32a in FIG. 6 of the terminal holding portion 32 constitutes a conductor connection surface 27a. The conductor connection surface 27a is connectable to a specific part of the conductor 12 by soldering with the part to be connected placed thereon. The conductor connection surface 27a according to this embodiment extends parallel to the upper surface 32a of the terminal holding portion 32.

In the first embodiment, the conductor connection surface 27a is formed with a recessed groove 29 as shown in FIG. 7. This recessed groove 29 extends in the longitudinal direction of the wire 10, and is shaped to restrict a displacement of the wire 10 in the array direction (width direction of the terminal 20; lateral direction in FIG. 7) by receiving the wire 10 fit therein. This recessed groove 29 has two positioning inclined surfaces 29a, 29b inclined toward each other in a direction parallel to the array direction to extend toward a bottom part of the recessed groove 29.

A projecting dimension of the first projecting portion 26 from the upper surface 32a of the terminal holding portion 32 is set to position the second projecting portion 27 such that the second projecting portion 27 extends in the second direction at a position where the surface of the second projecting portion 27 facing the upper surface 32a of the terminal holding portion 32, i.e. an inner side surface (lower surface in FIG. 6) 27b on a side opposite to the conductor connection surface 27a, is separated outward (upward in FIG. 6) from the upper surface 32a of the terminal holding portion 32.

In the first embodiment, outward projecting dimensions of the outward projecting portions 24 from the upper surface 32a of the terminal holding portion 32 are equal. That is, the terminal holding portion 32 holds the terminals 20 such that the conductor connection surfaces 27a of the respective terminals 20 are on the same plane. As just described, the conductor connection surfaces 27a of the terminals 20 of the first embodiment are equivalent to a plurality of planarly arrayed terminals arranged on a common plane.

Further, the terminal holding portion 32 according to the first embodiment holds the held portions 22 of the terminals 20 such that the conductor connection surfaces 27a of the terminals 20 are arranged at intervals in the array direction and, in addition, the conductor connection surfaces 27a of the terminals 20 adjacent in the array direction are shifted from each other in the longitudinal direction (vertical direction of FIG. 2) of the wires 10.

The wire holding portion 34 extends parallel to the second direction from the terminal holding portion 32 and holds the wires 10 so that the wires 10 extend along the second direction. The wire holding portion 34 according to the first embodiment includes parallel wire holding grooves 34a corresponding to the respective wires 10 and supports the wires 10 from below with the wires 10 fit in the wire holding grooves 34.

Figure 10:
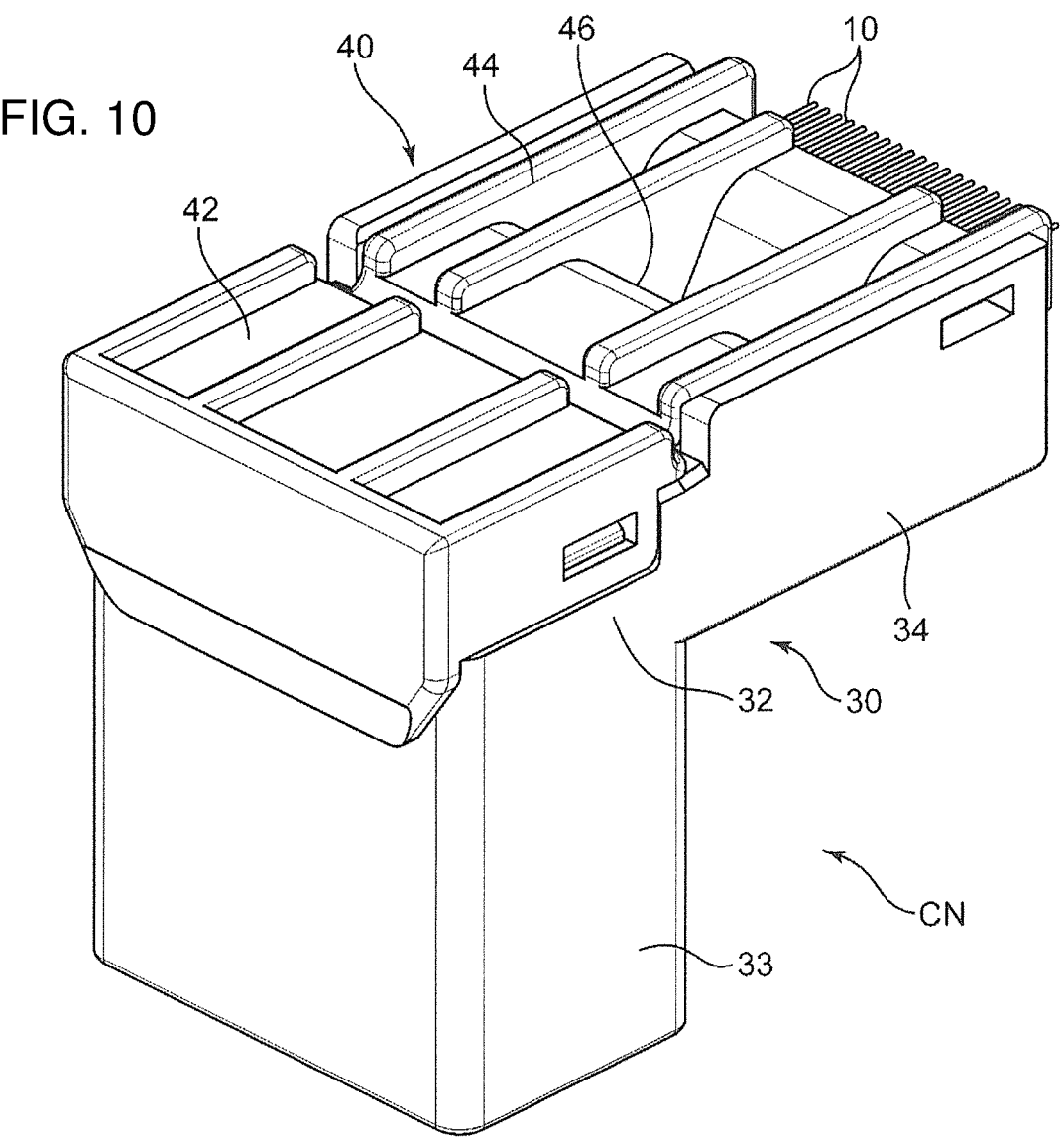
FIG. 10 is a perspective view showing a state where a cover is mounted on an insulating housing of the connector.

The connector CN of the first embodiment further includes a cover 40, as shown in FIG. 10. The cover 40 is mounted detachably on the insulating housing 30 to cover the outward projecting portions 24 of the terminals 20 and the wires 10 connected to the outward projecting portions 24 from above. Specifically, the cover 40 of the first embodiment integrally includes a terminal cover portion 42 for covering the terminal holding portion 32 and a wire cover portion 44 for covering the wire holding portion 34.

The upper surface of the wire holding portion 34, i.e. a surface formed with the wire holding grooves 34a, has a curved portion 36 curved to be recessed down at an intermediate position in the second direction, whereas the lower surface of the wire cover portion 44 of the cover 40 has a curved portion 46 bulging down to correspond to the curved portion 36. The curved portions 46, 36 are shaped to restrain intermediate parts of the wires 10 with the intermediate parts curved down, thereby effectively suppressing the action of tension of the wires 10 at connected positions of the parts to be connected of the respective conductors 12 and the conductor connection surfaces 27a.

Note that the wire holding portion 34 and the cover 40 are not essential in the present invention and can be omitted. Conversely, if the parts to be connected of the conductors 12 of the wires 10 are provided not near the ends of the wires 10, but at longitudinal intermediate parts, the wire holding portion 34 and the wire cover portion 44 of the cover 40 corresponding thereto may be provided on both sides of the terminal holding portion 32 in the longitudinal direction of the wires 10.

Next, a method for manufacturing the electrical connection assembly is described. This method includes the following steps.

1) Wire Preparing Step and Connector Preparing Step

The wires 10 and the connector CN described above are prepared in advance. Further, the wires 10 prepared include the insulation coatings 14 made of specific synthetic resin. The specific synthetic resin is synthetic resin having an insulating property at normal temperature and, on the other hand, meltable or dissolvable at a melting temperature (e.g. 380 to 400°) of solder used in a connecting step to be described later. Polyurethane, polyester, nylon and the like are preferable as the specific synthetic resin.

A thickness of the insulation coating 14 is set such that the insulation coating 14 can be removed and the conductor 12 can be exposed by heating while an insulating state is ensured at normal temperature. A dimension, for example, approximate to a thickness of an insulation coating in an ordinary enamel wire can be adopted as the thickness.

(2) Solder Setting Step

Solder SD, as shown in FIG. 6, is set in advance on the conductor connection surface 27a of each of the terminals 20 in the connector CN. This setting may be performed by placing the solder SD in a solid state on each conductor connection surface 27a or applying the solder SD in a paste state to each conductor connection surface 27a. Alternatively, the solder SD may be set on each terminal 20 in the manufacturing stage of the connector CN.

3) Connecting Step

Figure 1:
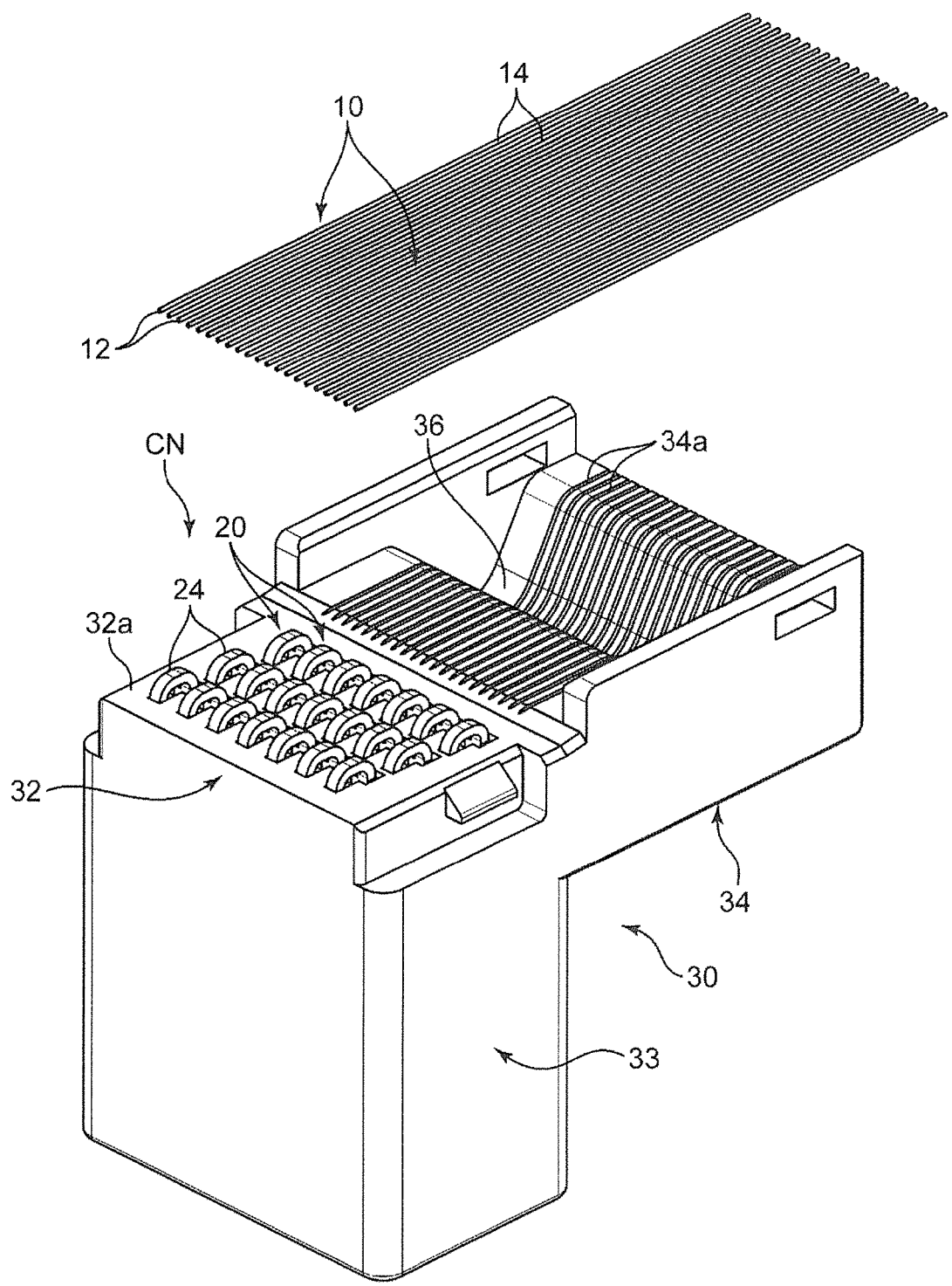
FIG. 1 is an exploded perspective view of an electrical connection assembly according to a first embodiment of the present invention.
Figure 2:
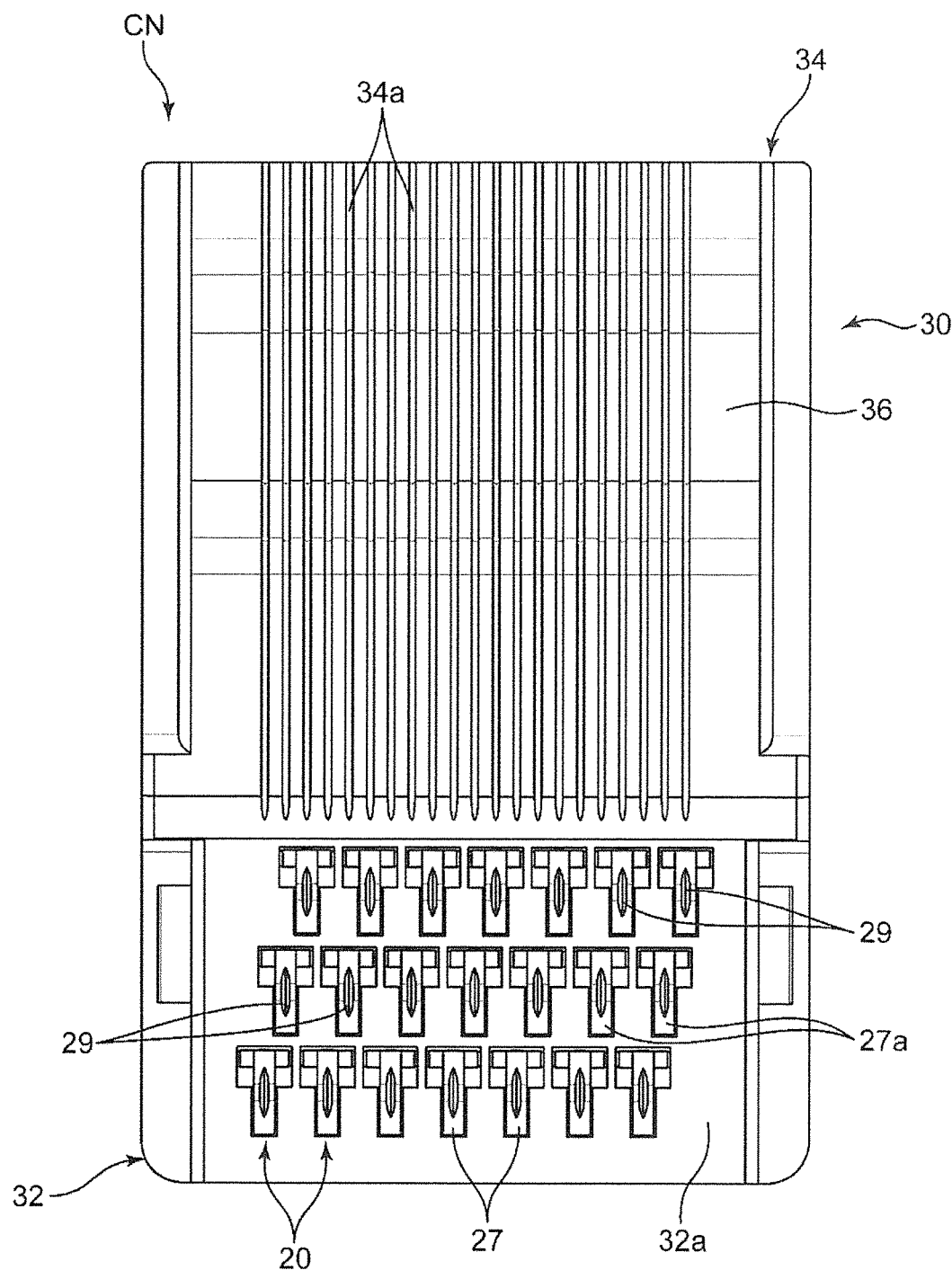
FIG. 2 is a plan view of a connector constituting the electrical connection assembly.
Figure 3:
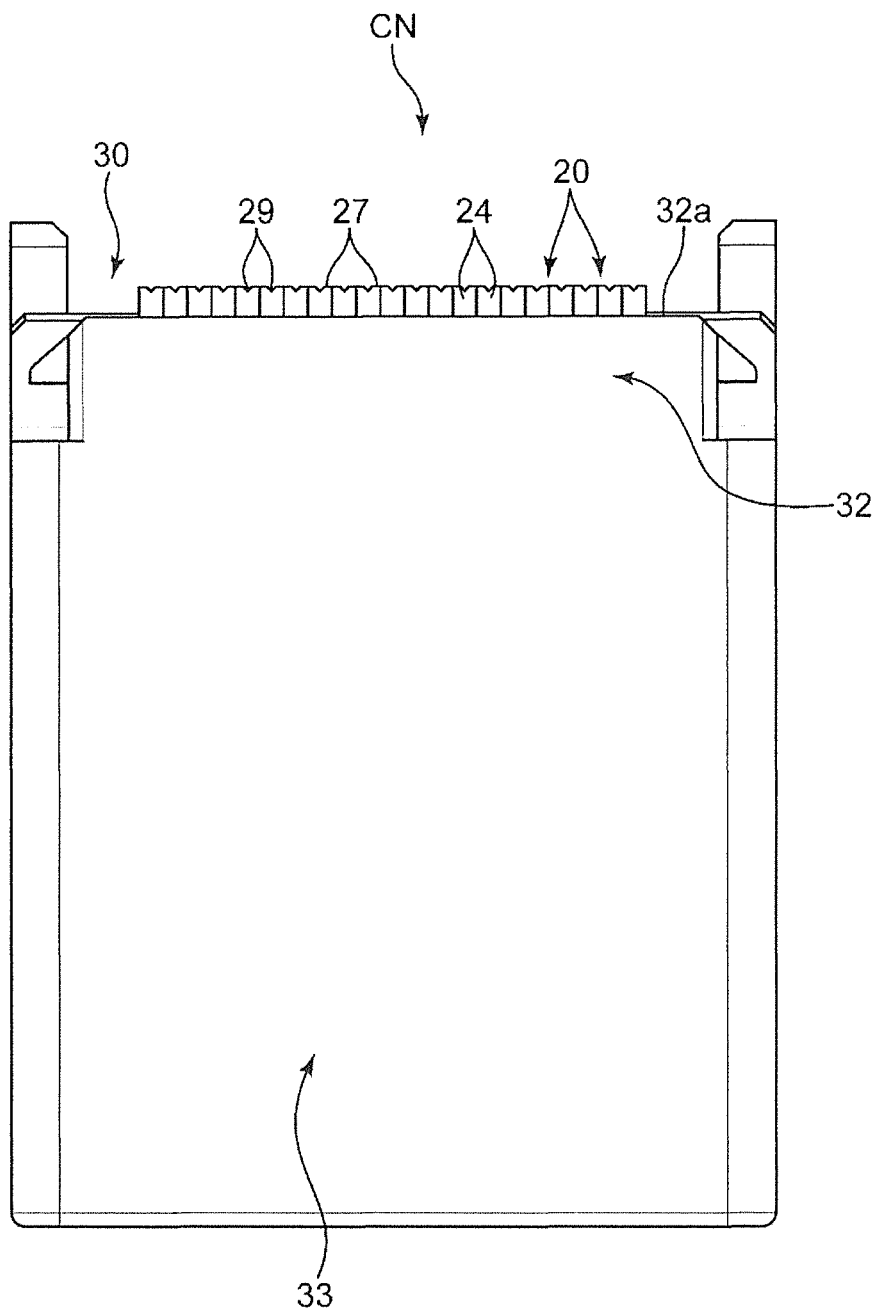
FIG. 3 is a front view of the connector.
Figure 4:
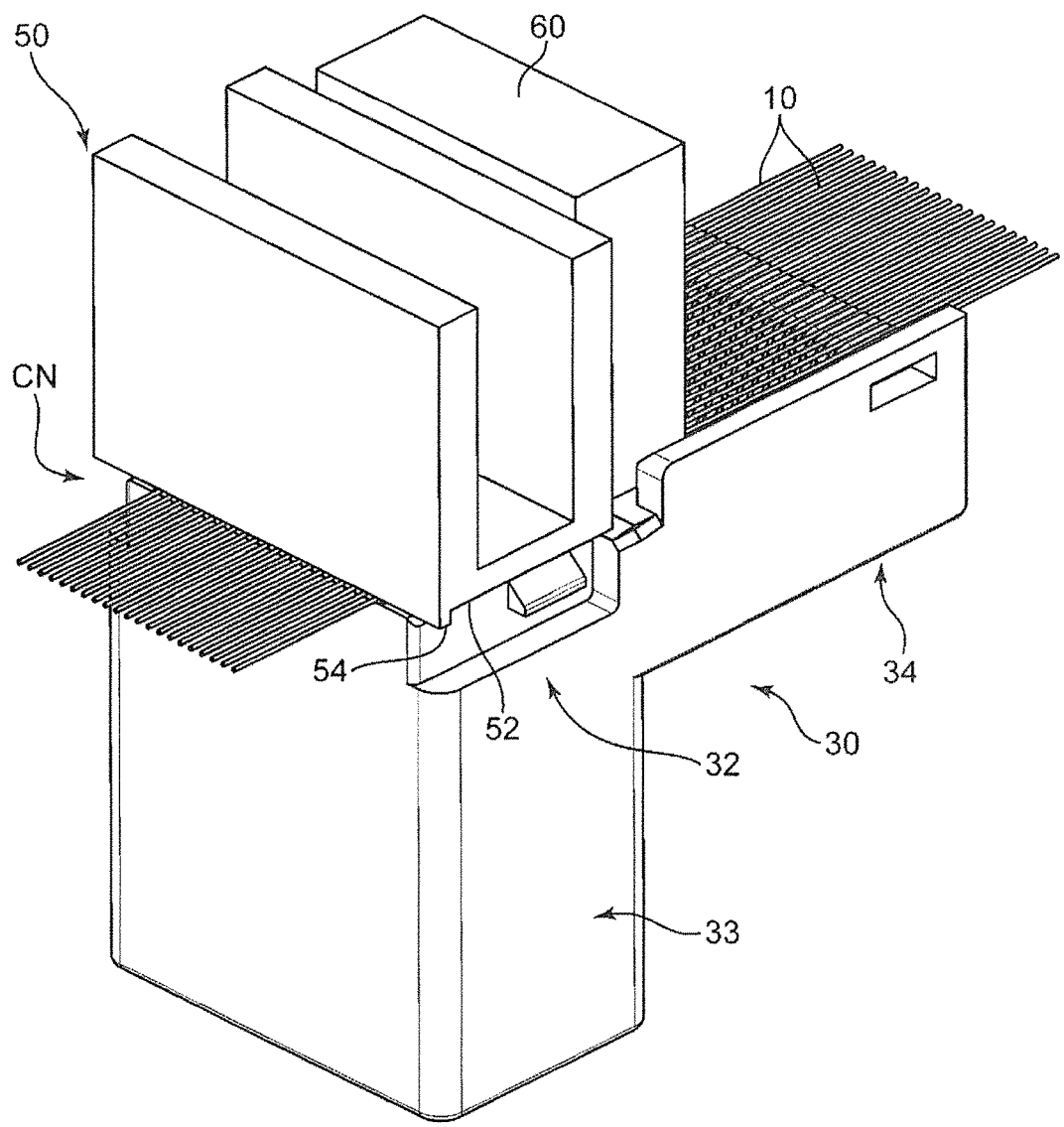
FIG. 4 is a perspective view showing a step of connecting conductor connection surfaces of terminals of the connector and parts to be connected of wires in a method for manufacturing the electrical connection assembly.

The parts to be connected set in longitudinally intermediate areas of the wires 10 are pressed toward the respective conductor connection surfaces 27a of the terminals 20 with the parts to be connected kept covered by the insulation coatings 14 and the insulation coatings 14 are heated together with the solder SD while the wires 10 are held in a state arrayed at intervals from each other in the array direction, as shown in FIG. 1. Thus, the insulation coatings 14 included in the parts to be connected are removed from the surfaces of the conductors 12 by melting or dissolving, and the conductors 12 exposed by removing the insulation coatings 14 and the conductor connection surfaces 27a are connected electrically by the solder SD.

The wires 10 are held by holding parts of the wires 10 at positions on outer sides across the parts to be connected, more preferably at positions outward of both ends of the connector CN in a front-rear direction (direction parallel to the second direction and the wire longitudinal direction). In this holding, the wires 10 are set on the corresponding conductor connection surfaces 27a while suitable tension is applied to each of the wires 10. The wires 10 can be held, for example, by bobbins on which the wires 10 are wound, clamping tools for clamping the wires 10 from both sides in a direction perpendicular to the longitudinal direction and the array direction of the wires 10 or the like.

Each conductor connection surface 27a is formed with the recessed groove 29, as shown in FIG. 7 in the first embodiment. Thus, a part of each wire 10 corresponding to the part to be connected is fit into the recessed groove 29 to be positioned reliably at a suitable position on the conductor connection surface 27a (generally a center position in the width direction of the conductor connection surface 27a, i.e. in the array direction), thereby restricting an escape from this position in the array direction. Note that the solder SD set on the conductor connection surface 27a is not shown in FIG. 7 for the sake of convenience.

The wires 10 can be pressed efficiently against the conductor connection surfaces 27a and heated, using a heater 50, as shown in FIGS. 4 to 6, 8 and 9. This heater 50 has a flat lower surface constituting a heating surface 52. The heating surface 52 is pressed against the wires 10 set on the respective conductor connection surfaces 27a via the solder SD from above. That is, the heating surface 52 is pressed toward the conductor connection surfaces 27a with the wires 10 respectively corresponding to the conductor connection surfaces 27a and the solder SD sandwiched between the heating surface 52 and the conductor connection surfaces 27a. This one method step simultaneously presses the wires 10 toward the conductor connection surfaces 27a, melts the solder SD by heating using the heater 52 and melts or dissolves the insulation coatings 14 covering the parts to be connected by heating the insulation coatings 14. The melting or dissolving of the insulation coatings 14 enables the insulation coatings 14 to be removed from the surfaces of the conductors 12. An operation of removing the insulation coatings 14 covering the parts that are to be connected need not be performed in advance. Thus, the conductors 12 can be connected electrically to the respective conductor connection surfaces 27a by soldering with drastic improvements in manufacturing efficiency.

In the first embodiment, the terminal holding portion 32 of the insulating housing 30 holds the terminals 20 with the respective conductor connection surfaces 27a arranged on the same plane, i.e. the respective terminals 20 constitute a planar array of terminals. Thus, the single planar heating surface 52 simultaneously connects the conductors 12 to the planar array of conductor connection surfaces 27a of the respective terminals 20.

In addition, each conductor connection surface 27a is on the outward projecting portion 24 of each terminal 20 and projects out (up in FIG. 6) from the upper surface 32a of the terminal holding portion 32 to be located at the position separated out from the upper surface 32a. The conductor connection surface 27a is constituted by the outer side surface of the second projecting portion 27 having the inner side surface 27b located at a position separated from the upper surface 32a. Thus, a short circuit between the terminals 20 and a short circuit between the wires 10 associated with the melting of the solder SD and the melting and removal of the insulation coatings 14 are suppressed. Thus, even if the solder SD is set, for example, in such a manner that the solid solder SD spreads across the plural terminals 20, the solder SD is divided naturally for each terminal 20 by the surface tension of the solder SD that has been heated as described above. Therefore, a short circuit via the solder SD is prevented.

In this connecting step, the wire 10 preferably is pressed toward the surface of the insulating housing 30 (preferably, the upper surface 32a of the terminal holding portion 32) at positions on both sides across the outward projecting portion 24 of the terminal 20, thereby deforming the wire 10 into an outward convex shape at the outward projecting portion 24, as shown in FIG. 6. In an example shown in FIGS. 4 to 6, the wire 10 is deformed by the cooperation of a pressing portion 54 provided in advance in the heater 50 and projecting farther out than the heating surface 52 and a pressing member 60 prepared separately from the heater 50.

Convex pressing of the wire 10 in this way reliably fixes a relative position of the part to be connected with respect to the conductor connection surface 27a and prevents the removal of the insulation coating 14 in parts other than the part to be connected due to the heating of these parts by the heater 50. In this way, a short circuit between the wires 10 due to the removal of the insulation coatings 14 is suppressed.

(4) Cutting Step

After the connecting step is completed as described above, the wires 10 are cut at a suitable position in their longitudinal direction. The wires 10 can be cut, for example, by sandwiching and shearing the wires 10 at a suitable cutting position in a direction perpendicular to the longitudinal direction and the array direction of the wires 10 by a pair of cutting tools. The connector CN is connected to the ends of the wires 10. Thus, the wires 10 are cut at positions on a side opposite to the wire holding portion 34 across the terminal holding portion 32 (preferably, at positions near an outer side surface of the terminal holding portion 32).

The electrical connection assembly is completed mounting the cover 40 as shown in FIG. 10, if necessary after the cutting step.

A second embodiment of the invention is described with reference to FIGS. 11 to 16.

The terminals 20 in the connector CN of the first embodiment are in a planar array. That is, the conductor connection surfaces 27a of the terminals 20 are held side by side on the same plane. On the other hand, a connector CN according to the second embodiment includes first terminals 20A and second terminals 20B having conductor connection surfaces 27a at different heights from an upper surface 32a of a terminal holding portion 32.

Figure 11:
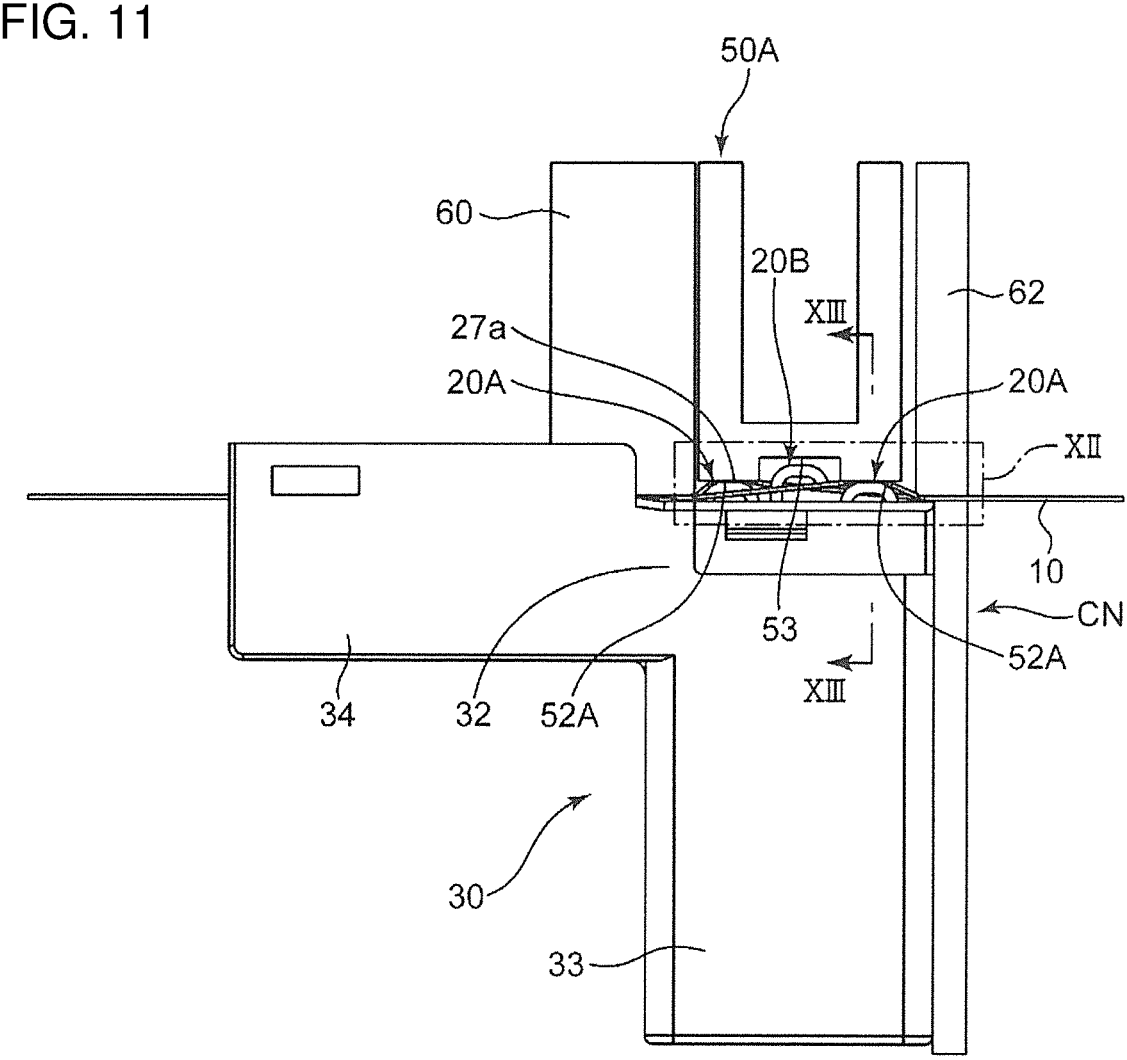
FIG. 11 is a side view showing a step of connecting conductor connection surfaces of first terminals and parts to be connected of wires corresponding thereto in a method for manufacturing an electrical connection assembly according to a second embodiment of the present invention.

The first and second terminals 20A, 20B are adjacent to each other in a direction parallel to the longitudinal direction of the wires 10. Specifically, in the second embodiment, the terminals 20 arranged in rows on both outer sides in the longitudinal direction are arrayed in three rows arranged in the longitudinal direction of the wires 10, as shown in FIG. 11, and are set as the first terminals 20A, and the second terminals 20B with the conductor connection surfaces 27a having a larger height than the terminals 20 in the center row. That is, the conductor connection surfaces 27a of the second terminals 20B are at a height position different from the conductor connection surfaces 27a of the first terminals 20A located at both sides of the second terminals 20B in the longitudinal direction of the wires 10 (at positions higher than the conductor connection surfaces 27a of the first terminals 20A, i.e. at positions more distant from the upper surface 32a of the terminal holding portion 32 in this embodiment).

Also in the second embodiment, a connecting step of heating the solder SD and the insulation coatings 14 covering the respective parts to be connected is performed after a solder setting step is performed as in the first embodiment. In this connecting step, the connection of the first terminals 20A and the wires 10 corresponding thereto and the connection of the second terminals 20B and the wires 10 corresponding thereto are performed in two stages, using a first heater 50A shown in FIGS. 11 to 13 and a second heater 50B shown in FIGS. 14 to 16.

Figure 12:
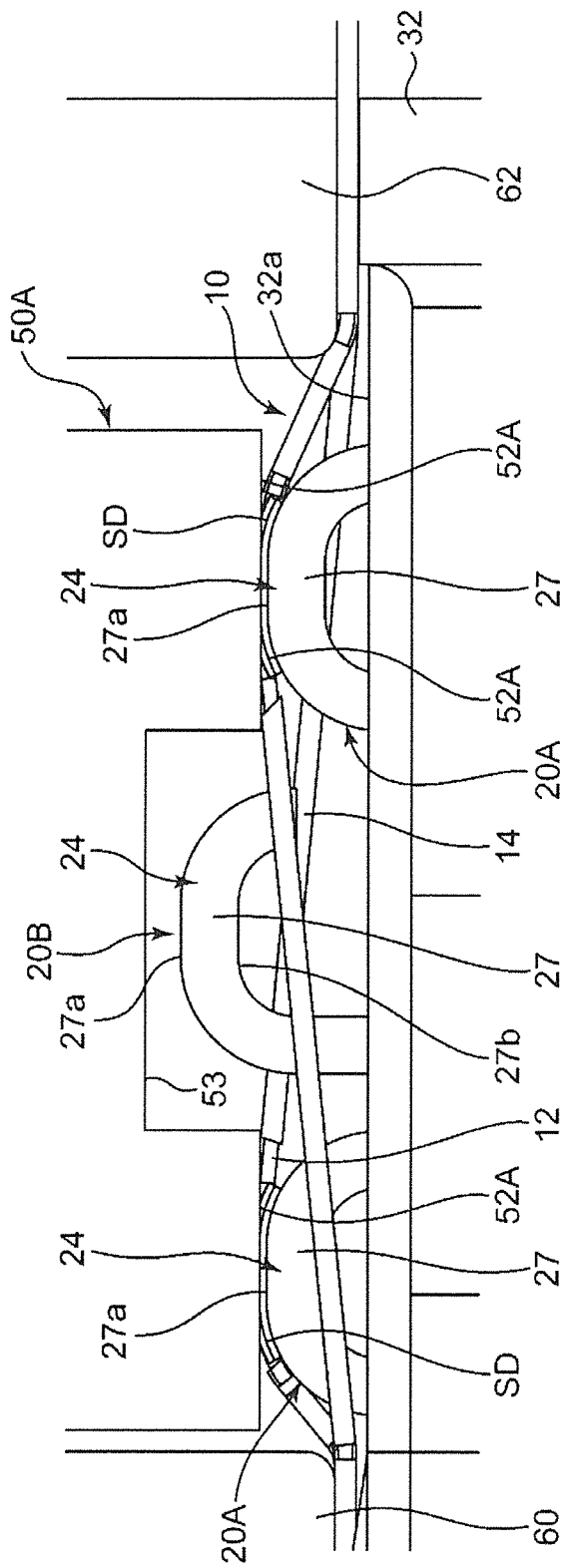
FIG. 12 is an enlarged view of an area enclosed by a frame line XII in FIG. 11.
Figure 13:
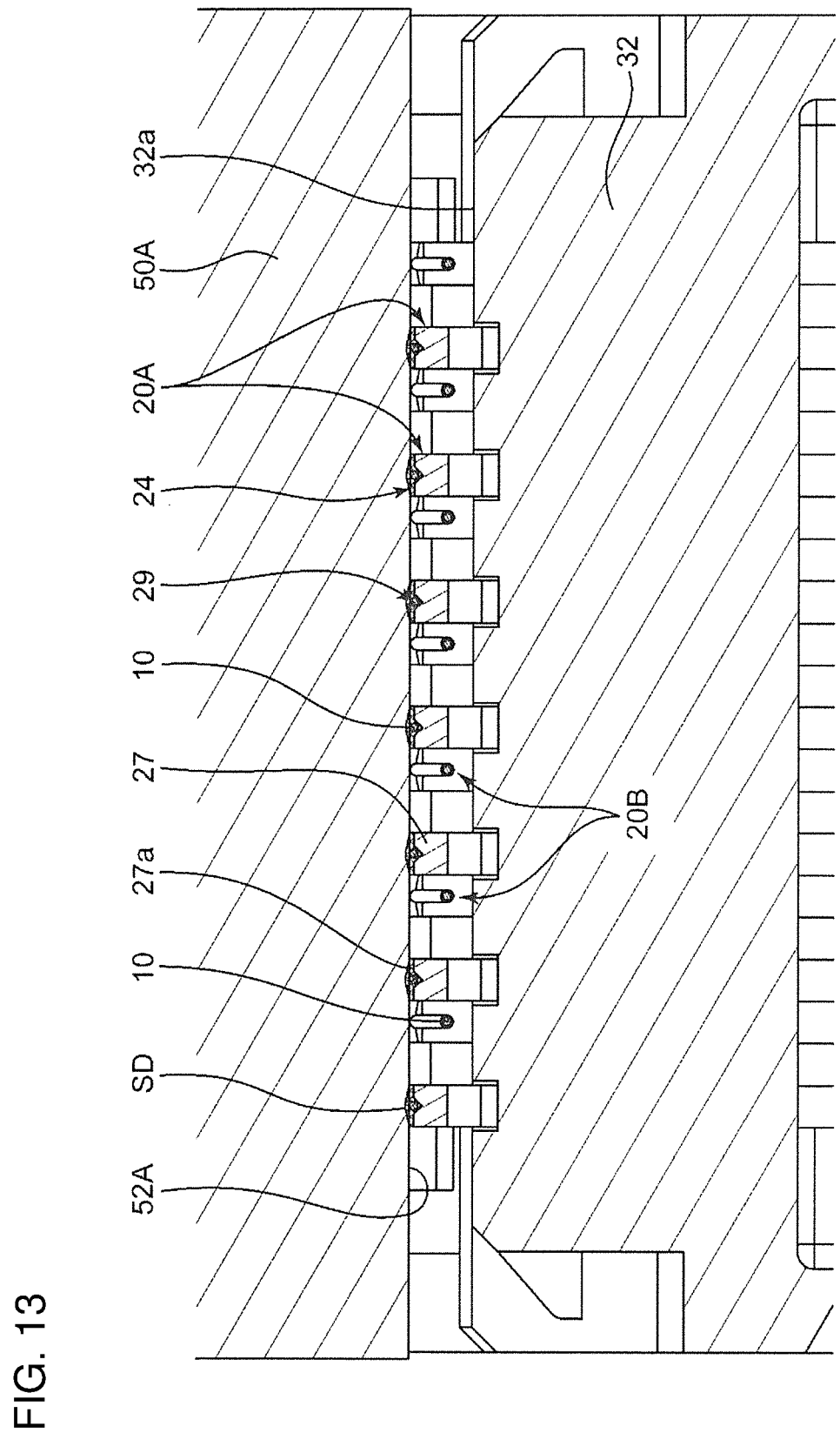
FIG. 13 is a section along XIII-XIII of FIG. 11.

As shown in FIGS. 11 to 13, the first heater 50A includes two first heating surfaces 52A located at positions corresponding to two rows in which the first terminals 20A are arranged, and a part 53 between the first heating surfaces 52A is offset up from the first heating surfaces 52A by a dimension sufficient to avoid interference with the second terminals 20B. First, the first heating surfaces 52A of the first heater 50A are pressed against the conductor connection surfaces 27a with the parts to be connected of the respective wires 10 and the solder SD sandwiched between the first heating surfaces 52A and the conductor connection surfaces 27a in the respective first terminals 20A. Thus, the second embodiment simultaneously melts the solder SD and removes the insulation coatings 14 from the connection surfaces of the conductors 12 by melting or dissolving the insulation coatings 14, as in the connecting step of the first embodiment. In this way, the conductor connection surfaces 27a in the first terminals 20A and the parts to be connected of the corresponding conductors 12 are connected electrically by the solder SD.

Figure 14:
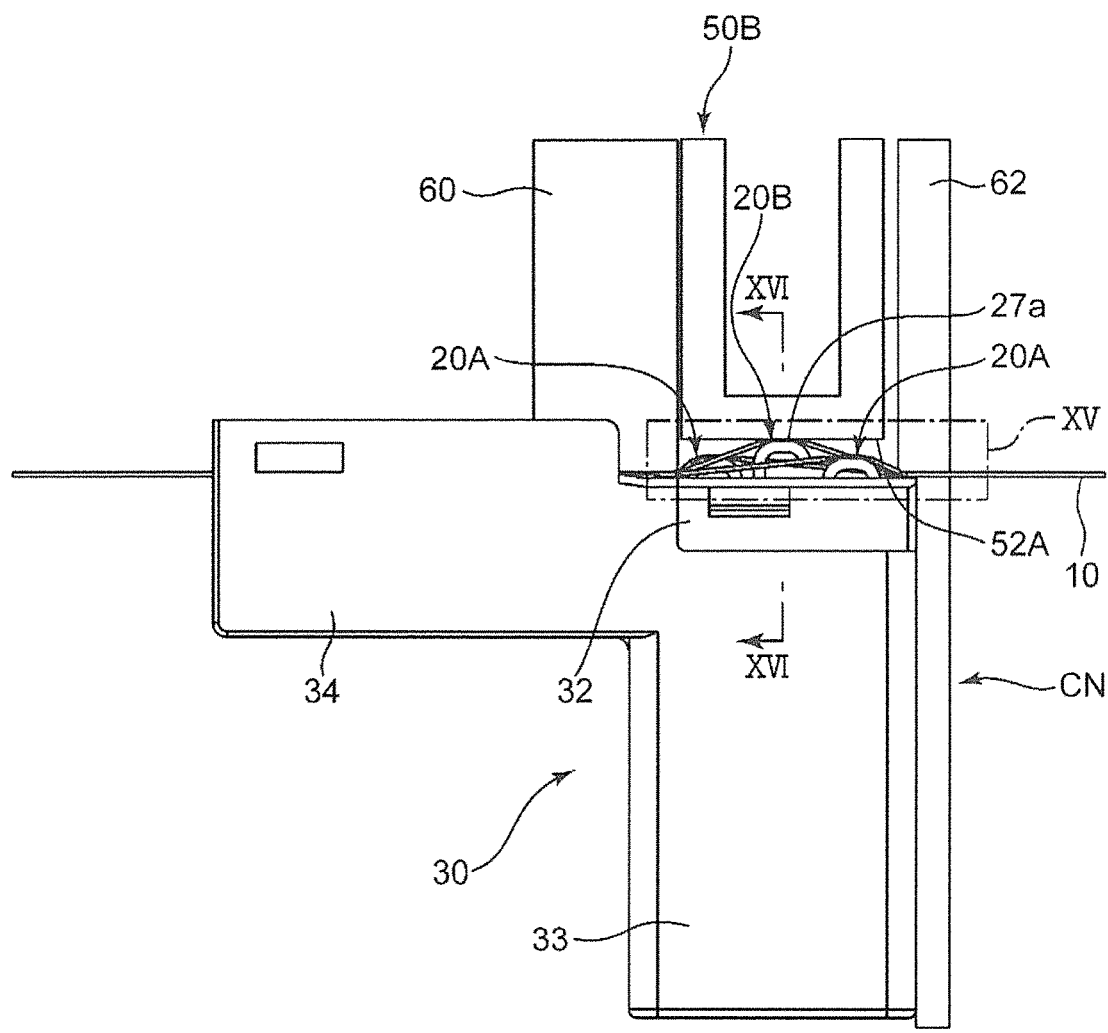
FIG. 14 is a side view showing a step of connecting conductor connection surfaces of second terminals and parts to be connected of the wires corresponding thereto in the method for manufacturing the electrical connection assembly according to the second embodiment of the present invention.
Figure 15:
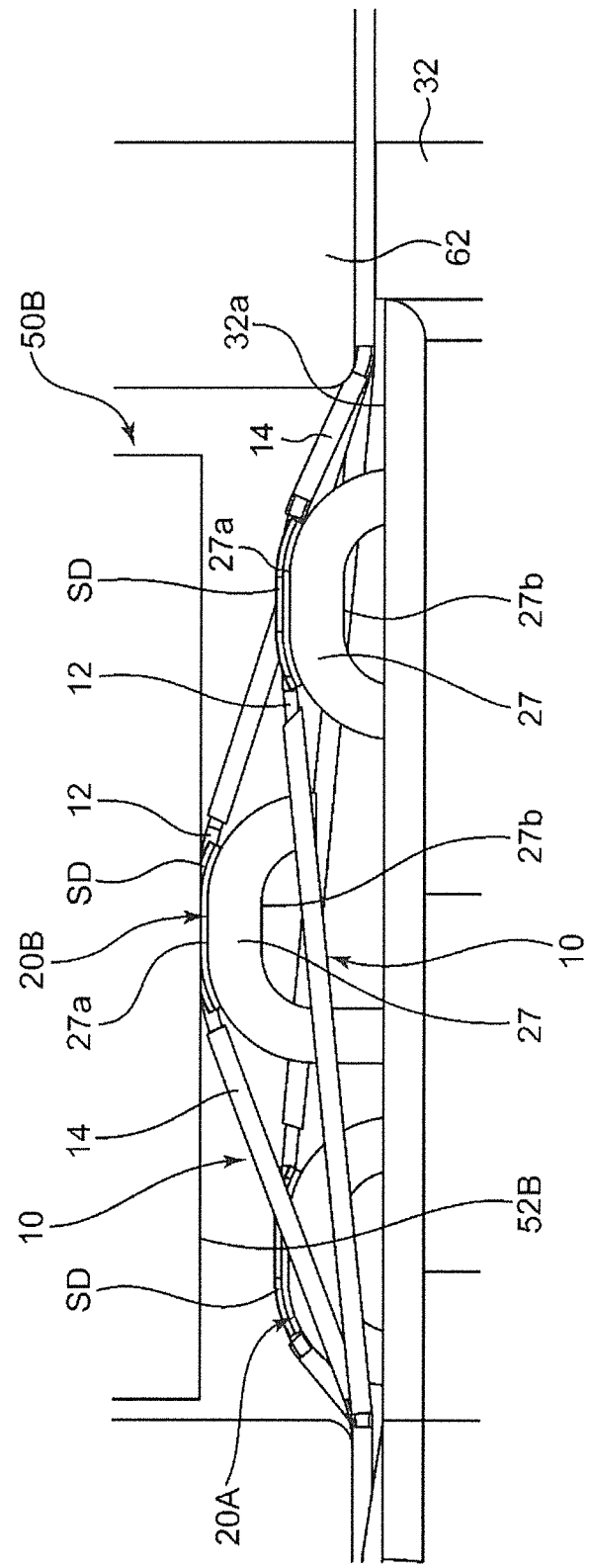
FIG. 15 is an enlarged view of an area enclosed by a frame line XV in FIG. 14.
Figure 16:
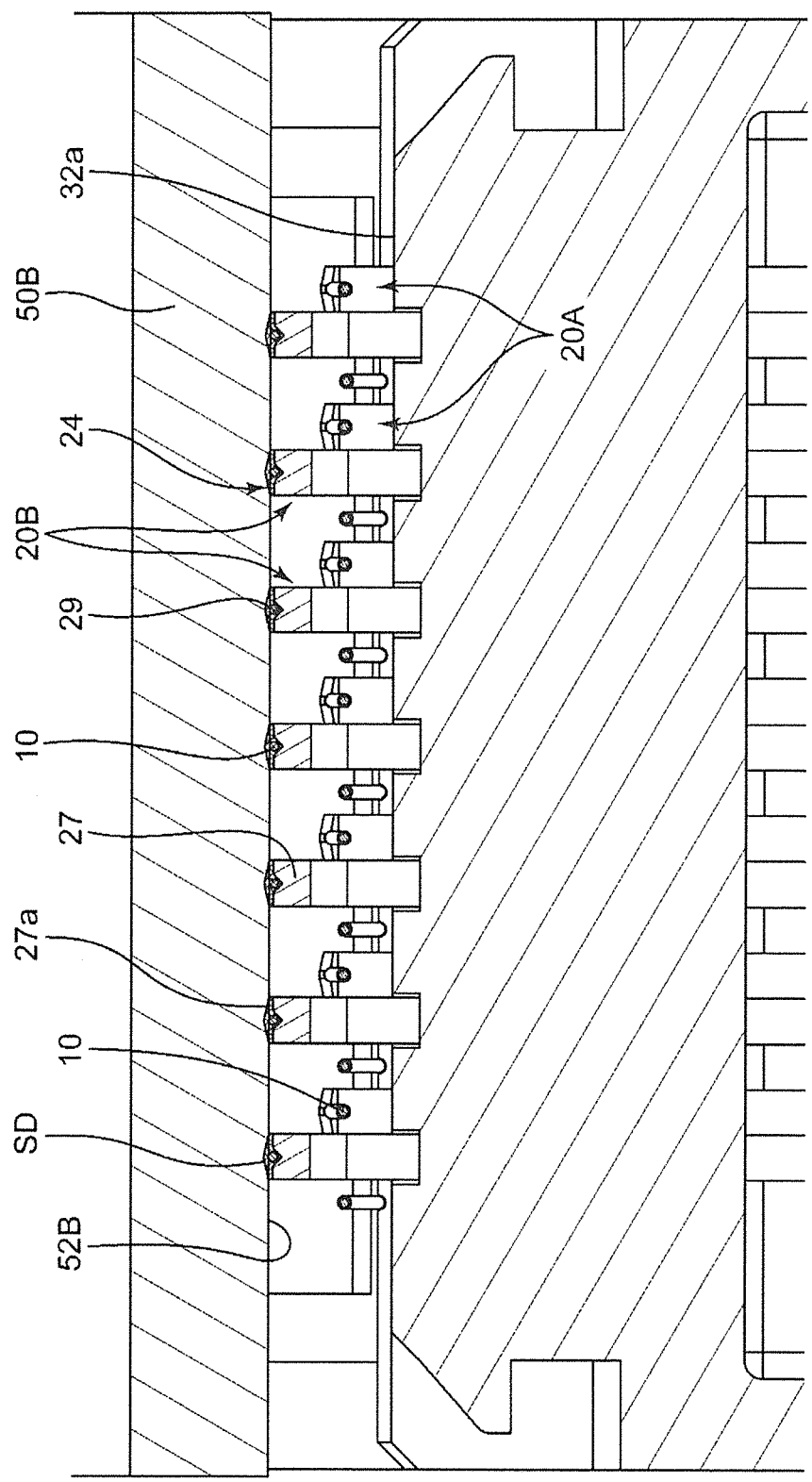
FIG. 16 is a section along XVI-XVI of FIG. 14.

As shown in FIGS. 14 to 16, the second heater 50B has a single second heating surface 52B, as in the heater 50 of the first embodiment. After the connection of the first terminals 20A and the wires 10 is completed, as described above, the second heating surface 52B of the second heater 50B is pressed against the conductor connection surfaces 27a with the respective wires 10 and the solder SD sandwiched between the second heating surface 52B and the conductor connection surfaces 27a in the respective second terminals 20B. In this way, the conductor connection surfaces 27a in the second terminals 20B and the parts of the corresponding conductors 12 are connected electrically by the solder SD, similar to the first terminals 20A.

The second solder connection for the second terminals 20B is performed at the position higher than the conductor connection surfaces 27a of the first terminals 20A (at the position more distant from the upper surface 32a of the terminal holding portion 32). Thus, an influence of heating in the second solder connection on the conductor connection surfaces 27a of the first terminals 20A is suppressed. This suppresses further removal of the insulation coatings 14 of the wires 10 corresponding to the first terminals 20A due to the second heating and prevent a short circuit due to the removal.

Also in the second embodiment, the connecting step preferably includes deforming the wires 10 into an outward convex shape at outward projecting portions 24 of the first and second terminals 20A, 20B by pressing the wires 10 against the upper surface 32a of the terminal holding portion 32 at positions on both sides across the outward projecting portions 24. In an example shown in FIGS. 11 to 16, the wires 10 are pressed using dedicated pressing members 60, 62.

The invention is not limited to the embodiments described above. The invention includes, for example, the following modes.

A) Concerning Wiring Material

The wiring material used in the invention is not limited to the one in which conductors 12 are covered individually by the insulation coatings 14 to configure the wires 10 as described above. The wiring material may be such that an insulation coating covering respective conductors adjacent to each other in the array direction is an integrally connected insulation coating, e.g. a flat cable or a ribbon cable.

B) Concerning Outward Projecting Portion

Figure 17:
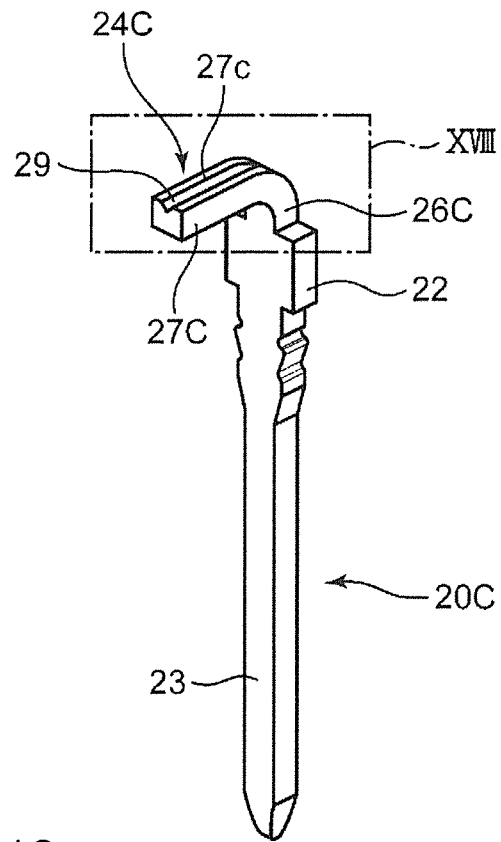
FIG. 17 is a perspective view of a terminal of a connector of an electrical connection assembly according to a third embodiment of the present invention.
Figure 18:
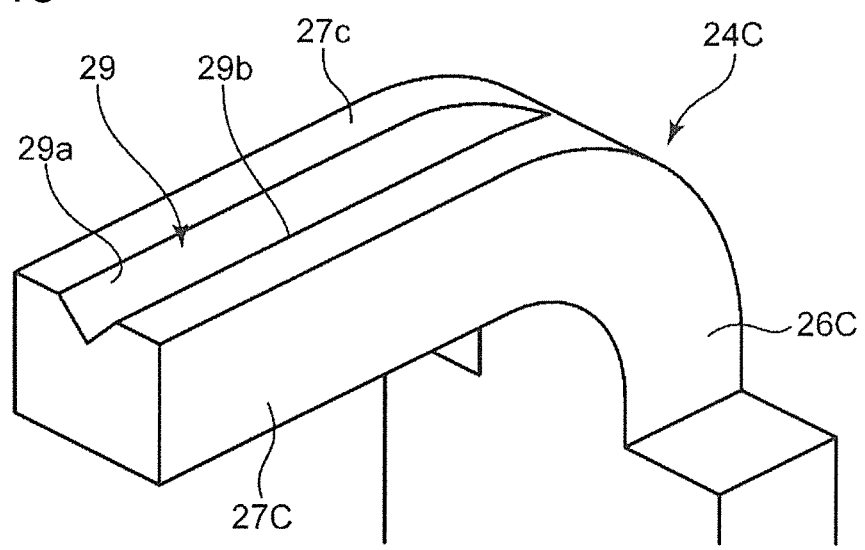
FIG. 18 is an enlarged view of an area enclosed by a frame line XVIII in FIG. 17.

The specific shape of the outward projecting portion of the terminal according to the present invention is not limited. For example, like an outward projecting portion 24C of a terminal 20C shown in FIGS. 17 and 18 as a third embodiment, the outward projecting portion may not include a third projecting portion, but may include a first projecting portion 26C and a second projecting portion 27C. Also in this case, an outer side surface (surface on a side opposite to the surface of the insulating housing) of the second projecting portion 27C constitutes a conductor connection surface 27c, thereby effectively suppressing a short circuit between the conductor connection surfaces 27c adjacent to each other. Further, the conductor connection surface 27c also is formed with a recessed groove 29 for preventing a deviation of a part to be connected, as shown in FIGS. 17 and 18.

Alternatively, if a cross-sectional area (area of a cross-section perpendicular to an axial direction) of the terminal is relatively large, an end surface of this terminal may be used directly as a conductor connection surface.

C) Concerning Connection Mode in Connecting Step

The connection made in the connecting step according to the invention is not limited to soldering. This connection only has to be associated with the heating of the part to be connected. For example, also in the case of connecting the part to be connected of the conductor and the conductor connection surface by welding (laser welding, ultrasonic welding, resistance welding or the like), the above effect can be obtained by removing the insulation coating covering the part to be connected by melting or dissolving the insulation coating, utilizing heat for welding.

The connection by soldering also is not limited to the mode described above. For example, heating for soldering is not limited to collective heating by the heater 50, 50A, 50B described above. For example, each terminal may be heated, using a small heater. Further, if the wiring material has a relatively large weight and needs not be pressed against the conductor connection surfaces, connection is possible without the pressing members 60, 62. Alternatively, the pressing, the soldering and the heating of the insulation coatings covering the parts to be connected may be separately performed by different means. Further, the heating may be performed not by heat transfer from the heater, but heat radiation.

D) Concerning Cutting Step and Cover

The cutting step and the cover 40 can be omitted. For example, the cutting step may be omitted if the connector CN is connected to intermediate parts of the wires 10 (like a connector for branch connection) or if there is no problem even if the wires 10 have an extra length after the connecting step. In other words, the parts to be connected in the wiring material in the electrical connection assembly as a product, i.e. parts of the wiring material to be connected to the conductor connection surfaces of the connector can be set arbitrarily.

As described above, a method is provided for manufacturing an electrical connection assembly with a wiring material including plural conductors and an insulation coating, and a connector is provided to enable reliable and efficient electrical connection of the conductors and the connector while avoiding a short circuit between the conductors.

The invention also provides a method for manufacturing an electrical connection assembly with a wiring material including conductors and an insulation coating covering the conductors and a connector including terminals respectively corresponding to the of conductors and an insulating housing for collectively holding the terminals. The conductors respectively are connected conductively to the terminals while being arranged in an array direction perpendicular to a longitudinal direction of the conductors. This method includes a wiring material preparing step of preparing a wiring material including an insulation coating made of synthetic resin that is meltable or dissolvable by being heated. The method also includes a connector preparing step of preparing a connector, in which each of the terminals includes an outward projecting portion projecting out of the insulating housing from a surface of the insulating housing. Each outward projecting portion has a conductor connection surface at a position separated from the surface of the insulating housing, and the insulating housing holds the terminals with the conductor connection surfaces arranged in the array direction at the same intervals as the intervals of the conductors in the array direction. The method further includes a connecting step of removing the insulation coating from surfaces of the conductors by melting or dissolving of the insulation coating by heating the insulation coating covering parts to be connected set in the conductors and electrically connecting the conductors exposed by removing the insulation coating to the conductor connection surfaces by the heating while the conductors are held at intervals from each other in the array direction.

According to this method, the connection of the conductors to the conductor connection surfaces and the removal of the insulation coating from the conductors by melting or dissolving are performed simultaneously by heating the insulation coating covering the parts to be connected with the respective parts to be connected kept covered by the insulation coating. Thus, a step of removing the insulation coating in advance is not necessary. This enables drastic improvement of manufacturing efficiency. In addition, each conductor connection surface is provided on the outward projecting portion of each terminal projecting outwardly of the insulation housing from the surface of the insulation housing and is located at the position separated from the surface of the insulating housing. Thus, a short circuit between the terminals associated with the heating is prevented.

The conductors and the conductor connection surfaces only have to be connected by heating the wiring material. For example, connection by soldering and welding (laser welding, ultrasonic welding, resistance welding, or the like) are preferable.

In the case of connection by soldering, the connecting step includes connecting the conductors in the parts to be connected and the conductor connection surfaces by melting the insulation coating covering the parts to be connected and the solder by heating using a heater while the heater is pressed toward the conductor connection surfaces with the parts to be connected covered by the insulation coating and the solder sandwiched between the conductor connection surfaces included in the outward projecting portions and the heater. The pressing by the heater makes the electrical connection of the conductors and the conductor connection surfaces by soldering more reliable after the insulation coating is removed by heating using the heater.

In this case, the terminals include a planar array of terminals having the respective conductor connection surfaces arranged on a common plane, and the connecting step includes simultaneously connecting the conductors and the conductor connection surfaces by heating using the heater while a planar heating surface is pressed toward the conductor connection surfaces with the parts to be connected respectively corresponding to the conductor connection surfaces and the solder sandwiched between the heating surface of the heater and the conductor connection surfaces of the planar array of terminals. This method enables the removal of the insulation coating and the soldering of the conductors to the conductor connection surfaces to be performed collectively by the common heater.

In this method, the terminals may include first terminals having the conductor connection surfaces located at a first height from the surface of the insulating housing and second terminals adjacent to the first terminals in a direction parallel to the longitudinal direction of the wiring material and having the conductor connection surfaces located at a second height different from the first height. Also by making the heights of the conductor connection surfaces of the terminals adjacent to each other in the direction parallel to the longitudinal direction of the wiring material different in this way, a short circuit between the terminals adjacent to each other is suppressed more effectively.

The connecting step includes connecting the conductor connection surfaces of the outward projecting portions of the second terminals and the conductors corresponding thereto after the conductor connection surfaces of the first terminals and the conductors corresponding thereto are connected. Thus, the insulation coating in parts unrelated to the connection is removed by heating for each connection, and a short circuit between the conductors can be prevented more reliably.

The connecting step may include pressing the wiring material toward the respective conductor connection surfaces of the terminals and heating the wiring material while applying tension to the wiring material by holding the wiring material at holding positions separated from each other in the longitudinal direction across the parts to be connected with the conductors arrayed at intervals from each other in the array direction. The connection made while tension is applied to the wiring material in this way makes the contact of the wiring material and the conductor connection surfaces (direct contact or contact via the solder) more reliable. Thus, connection reliability can be enhanced.

Furthermore, the connecting step may include deforming the wiring material into an outward convex shape at the outward projecting portions of the terminals by pressing the wiring material toward the surface of the insulating housing at positions on both sides across the outward projecting portions. Such pressing of the wiring material reliably fixes relative positions of the parts of the conductors to be connected with respect to the conductor connection surfaces of the terminals and suppresses the removal of the insulation coating in parts of the wiring material other than the parts to be connected to the conductor connection surfaces (i.e. parts around the parts to be connected) by heating these parts. This prevents a short circuit between the conductors due to the removal of the insulation coating.

The invention claimed is:

1. A method for manufacturing an electrical connection assembly with a wiring material including conductors, an insulation coating covering the conductors and a connector including terminals respectively corresponding to the conductors and an insulating housing collectively holding the terminals, the conductors being respectively conductively connected to the terminals while being arranged in an array direction perpendicular to a longitudinal direction of the conductors, the method comprising:
   a wiring material preparing step of preparing a wiring material including the insulation coating made of synthetic resin that is meltable or dissolvable by being heated;
   a connector preparing step of preparing a connector, in which each of the terminals includes an outward projecting portion projecting outward of the insulating housing from a surface of the insulating housing, each outward projecting portion has a conductor connection surface at a position separated from the surface of the insulating housing, and the insulating housing holds the terminals such that the conductor connection surfaces are arranged in the array direction at the same intervals as those of the conductors in the array direction; and
   a connecting step of removing the insulation coating from surfaces of the conductors by melting or dissolving of the insulation coating by heating the insulation coating covering parts to be connected set in the respective conductors and electrically connecting the conductors exposed by removing the insulation coating to the conductor connection surfaces by the heating while the conductors are held in a state arrayed at intervals from each other in the array direction.

2. The method for manufacturing an electrical connection assembly of claim 1, wherein the connecting step includes connecting the conductors in the parts to be connected and the conductor connection surfaces by heating the insulation coating covering the parts to be connected and solder with the solder sandwiched between the conductor connection surfaces included in the outward projecting portions and the wiring material.

3. The method for manufacturing an electrical connection assembly of claim 2, wherein the connecting step includes pressing a heater toward the conductor connection surfaces with the insulation coating and the solder sandwiched between the conductor connection surfaces and the heater.

4. The method for manufacturing an electrical connection assembly of claim 3, wherein the terminals of the connector prepared in the connector preparing step include planar array of the terminals having the respective conductor connection surfaces arranged on a common plane, and the connecting step includes simultaneously connecting parts of the conductors to be connected and the respective conductor connection surfaces by heating using the heater with a planar heating surface that is pressed toward the conductor connection surfaces with the conductors respectively corresponding to the conductor connection surfaces and the solder sandwiched between the heating surface of the heater and the planar array of the conductor connection surfaces of the terminals.

5. The method for manufacturing an electrical connection assembly of claim 3, wherein the terminals of the connector prepared in the connector preparing step include first terminals having the conductor connection surfaces located at a first height from the surface of the insulating housing and second terminals adjacent to the first terminals in a direction parallel to the longitudinal direction of the wiring material and having the conductor connection surfaces located at a second height different from the first height.

6. The method for manufacturing an electrical connection assembly of claim 5, wherein the connecting step includes connecting the conductor connection surfaces of the outward projecting portions of the second terminals and the conductors of the wiring material corresponding thereto after the conductor connection surfaces of the first terminals and the conductors of the wiring material corresponding thereto are connected.

7. The method for manufacturing an electrical connection assembly of claim 3, wherein the connecting step includes pressing the parts to be connected toward the respective conductor connection surfaces of the terminals and heating the parts to be connected together with the solder while applying tension to the wiring material by holding the wiring material at holding positions separated from each other in the longitudinal direction across the parts of the wiring material to be connected with the conductors arrayed at intervals from each other in the array direction.

8. The method for manufacturing an electrical connection assembly of claim 7, wherein the connecting step includes deforming the wiring material into an outward convex shape at the outward projecting portions of the terminals by pressing the wiring material toward the surface of the insulating housing at positions on both sides across the outward projecting portions.

* * * * *